United States Patent [19]
Reh et al.

[11] Patent Number: 6,115,998
[45] Date of Patent: Sep. 12, 2000

[54] METHOD AND DEVICE FOR FOLDING AN AIRBAG FOR STOWING IN AN AIRBAG MODULE

[75] Inventors: Stefan Reh, Wörth am Main; Thomas Marotzke, Bergfelde, both of Germany

[73] Assignee: Petri AG, Aschaffenburg, Germany

[21] Appl. No.: 09/043,049

[22] PCT Filed: Jul. 4, 1996

[86] PCT No.: PCT/DE96/01250

§ 371 Date: Mar. 11, 1998

§ 102(e) Date: Mar. 11, 1998

[87] PCT Pub. No.: WO97/10124

PCT Pub. Date: Mar. 20, 1997

[30] Foreign Application Priority Data

Sep. 12, 1995 [DE] Germany .......................... 195 35 564

[51] Int. Cl.⁷ .................................................. B65B 63/04
[52] U.S. Cl. .................................................. 53/429
[58] Field of Search .............................. 53/117, 120, 427, 53/429

[56] References Cited

U.S. PATENT DOCUMENTS

| | | | |
|---|---|---|---|
| 3,843,152 | 10/1974 | Nonaka | 280/150 AB |
| 3,876,272 | 4/1975 | Tsutsumi et al. | 339/3 S |
| 3,907,330 | 9/1975 | Kondo et al. | 280/150 AB |
| 4,173,356 | 11/1979 | Ross | 280/743 |
| 4,178,344 | 12/1979 | Smith et al. | 264/572 |
| 4,235,453 | 11/1980 | Lawson et al. | 280/743 |
| 4,351,544 | 9/1982 | Ross | 280/743 |
| 4,718,884 | 1/1988 | Iwase et al. | 493/419 |

(List continued on next page.)

FOREIGN PATENT DOCUMENTS

| | | |
|---|---|---|
| 0478897 | 4/1992 | European Pat. Off. . |
| 0614786 | 9/1994 | European Pat. Off. . |
| 0619204 | 10/1994 | European Pat. Off. . |
| 0691245 | 1/1996 | European Pat. Off. . |
| 829396 | 10/1997 | European Pat. Off. . |
| 829396 | 3/1998 | European Pat. Off. . |
| 2524770 | 12/1976 | Germany . |
| 4138645 | 6/1992 | Germany . |
| 4227559 A1 | 2/1994 | Germany . |

(List continued on next page.)

OTHER PUBLICATIONS

Adomeit, H–D: "Neue Methoden Und Neue Ziele Bei Der Entwicklung Von Insassen Schutzsystemem/New Methodology and New Targest In Development Of Occupant Protection Systems" ATZ Automobiltechnische Zeitschrift Bd. 97, No. 07/08 pp. 458–462 (with English translation blow–up of p. 459) Jun./Jul. 1995.

Airbags Are Everywhere: How Are They Doing?, by Carl E. Nash, Ph.D. 2nd International Akzo Symposium On Occupatent Restraint Systems, Mar. 25–27, 1992, pp. 84–93 (English and German translations).

Pam–Safe; Seminar Notes by Engineering Systems International, 8 pages, Jul. 1990.

Patent Abstracts of Japan, Publication No. 03279053, Publication Date Dec. 10, 1991, 1 page.

*Primary Examiner*—Joseph J. Hail, III
*Assistant Examiner*—Dermott J. Cooke
*Attorney, Agent, or Firm*—Christie, Parker & Hale, LLP

[57] ABSTRACT

A method for folding an airbag for an airbag module is characterized in that an empty airbag is spread out and gathered in towards a center to give a folded airbag. The airbag is gathered inside a fixed vertical profiled section having a top and a bottom separated by a distance corresponding to the predetermined height of the folded airbag. Only a few gathering tools and only a few operations are necessary to gather the airbag. A device for carrying out the method is characterized by a lower part on which the airbag is spread out flat and an upper part separated from the lower part by a distance that corresponds to the vertical profile required for the gathered airbag. Gathering tools are mounted between the upper part and the lower part so that they surround the airbag and so that their position relative to the airbag can be changed.

36 Claims, 9 Drawing Sheets

U.S. PATENT DOCUMENTS

| | | | |
|---|---|---|---|
| 4,842,300 | 6/1989 | Ziomek et al. | 280/732 |
| 4,903,871 | 2/1990 | Glassman | 223/388 |
| 4,903,986 | 2/1990 | Cok et al. | 280/743 |
| 4,936,819 | 6/1990 | Sundberg | 493/451 |
| 5,022,676 | 6/1991 | Rogerson et al. | 280/743 |
| 5,037,370 | 8/1991 | Sundberg | 493/451 |
| 5,114,180 | 5/1992 | Kami et al. | 280/743 |
| 5,140,799 | 8/1992 | Satoh | 53/429 |
| 5,162,035 | 11/1992 | Baker | 493/405 |
| 5,163,893 | 11/1992 | Hara et al. | 493/458 |
| 5,178,407 | 1/1993 | Kelley | 280/728 |
| 5,300,011 | 4/1994 | Budde et al. | 493/405 |
| 5,350,473 | 9/1994 | Weder et al. | 156/212 |
| 5,351,977 | 10/1994 | Grace | 280/738 |
| 5,360,387 | 11/1994 | Baker | 493/405 |
| 5,391,137 | 2/1995 | DePoy et al. | 493/405 |
| 5,413,375 | 5/1995 | Daines et al. | 280/728.2 |
| 5,413,376 | 5/1995 | Filion et al. | 280/728 |
| 5,456,651 | 10/1995 | Baker et al. | 493/405 |
| 5,482,317 | 1/1996 | Nelsen et al. | 280/743.1 |
| 5,493,846 | 2/1996 | Baker et al. | 53/429 |
| 5,531,476 | 7/1996 | Kerner | 280/743.1 |
| 5,613,348 | 3/1997 | Lunt et al. | 53/429 |
| 5,690,358 | 11/1997 | Marotzke | 280/743.1 |
| 5,803,892 | 9/1998 | Marotzke | 493/451 |
| 5,810,385 | 9/1998 | Henseler et al. | 280/728.1 |
| 5,826,901 | 10/1998 | Adomeit | 280/728.2 |

FOREIGN PATENT DOCUMENTS

| | | |
|---|---|---|
| 4343026 | 6/1994 | Germany . |
| 4422276 | 12/1994 | Germany . |
| 195 16 494 | 2/1995 | Germany . |
| 51-68043 | 6/1976 | Japan . |
| 52-14497 | 4/1977 | Japan . |
| 53-26888 | 8/1978 | Japan . |
| 53-26889 | 8/1978 | Japan . |
| 58-49541 | 3/1983 | Japan . |
| 2279442 | 11/1990 | Japan . |
| 5-85292 | 5/1993 | Japan . |
| 2192841 | 1/1988 | United Kingdom . |
| WO9633886 | 10/1996 | WIPO . |
| WO9634781 | 11/1996 | WIPO . |
| WO9710124 | 3/1997 | WIPO . |
| WO9712782 | 4/1997 | WIPO . |
| WO9728024 | 8/1997 | WIPO . |
| WO97/35745 | 10/1997 | WIPO . |
| WO9735745 | 10/1997 | WIPO . |
| WO9745296 | 12/1997 | WIPO . |
| WO9748580 | 12/1997 | WIPO . |

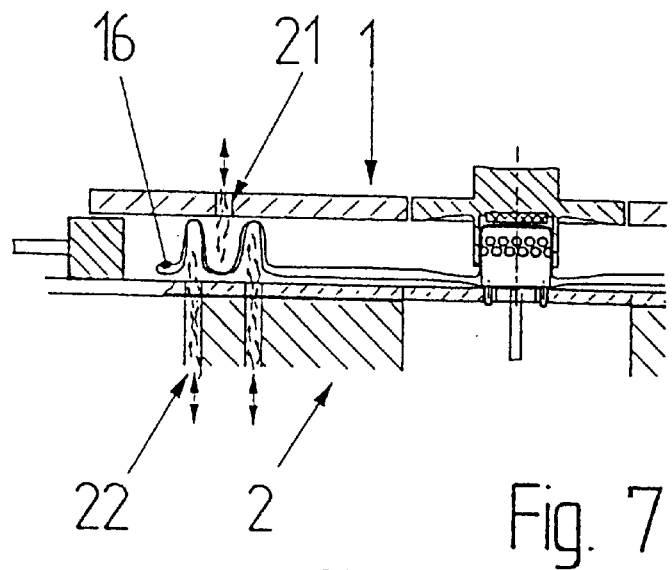
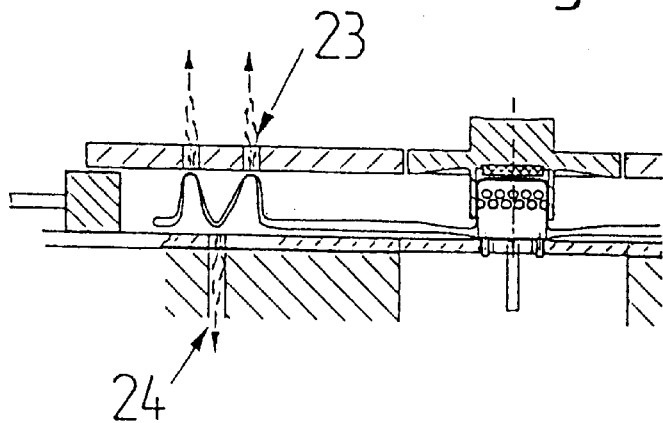
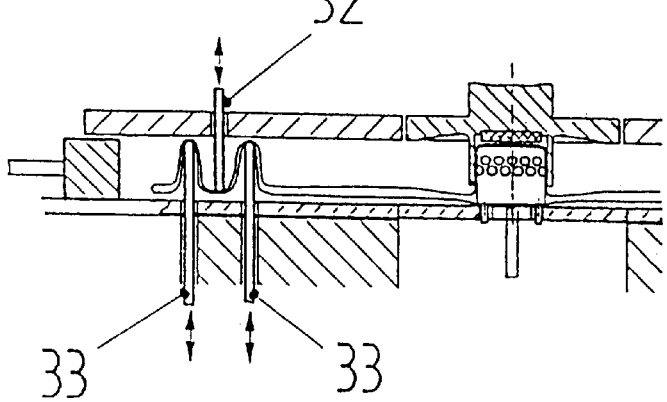

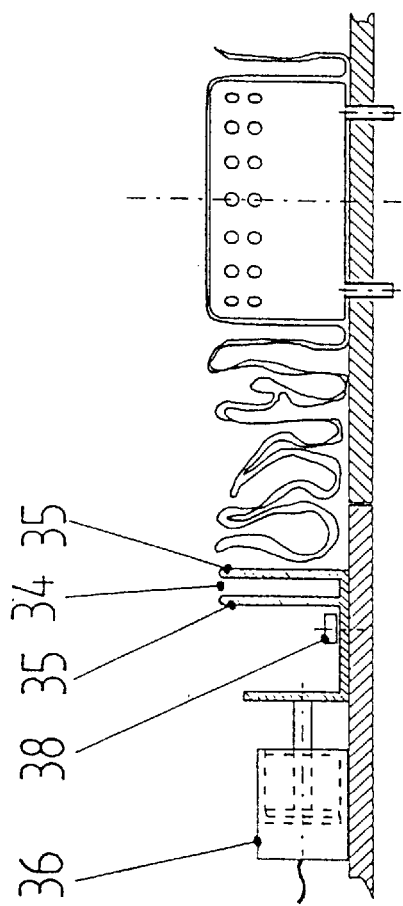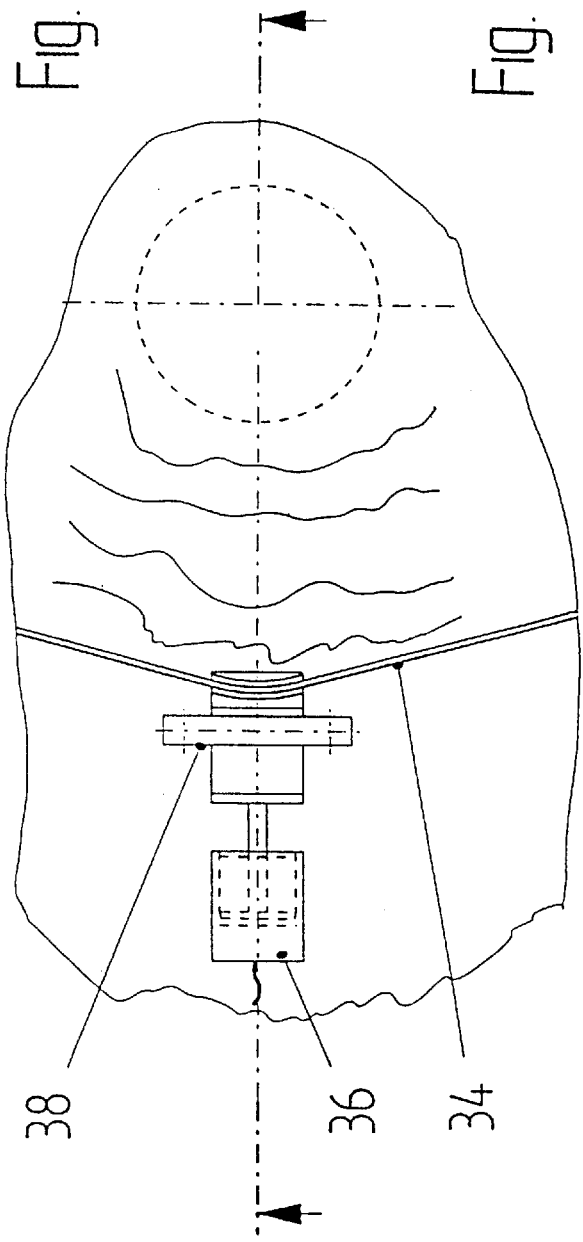

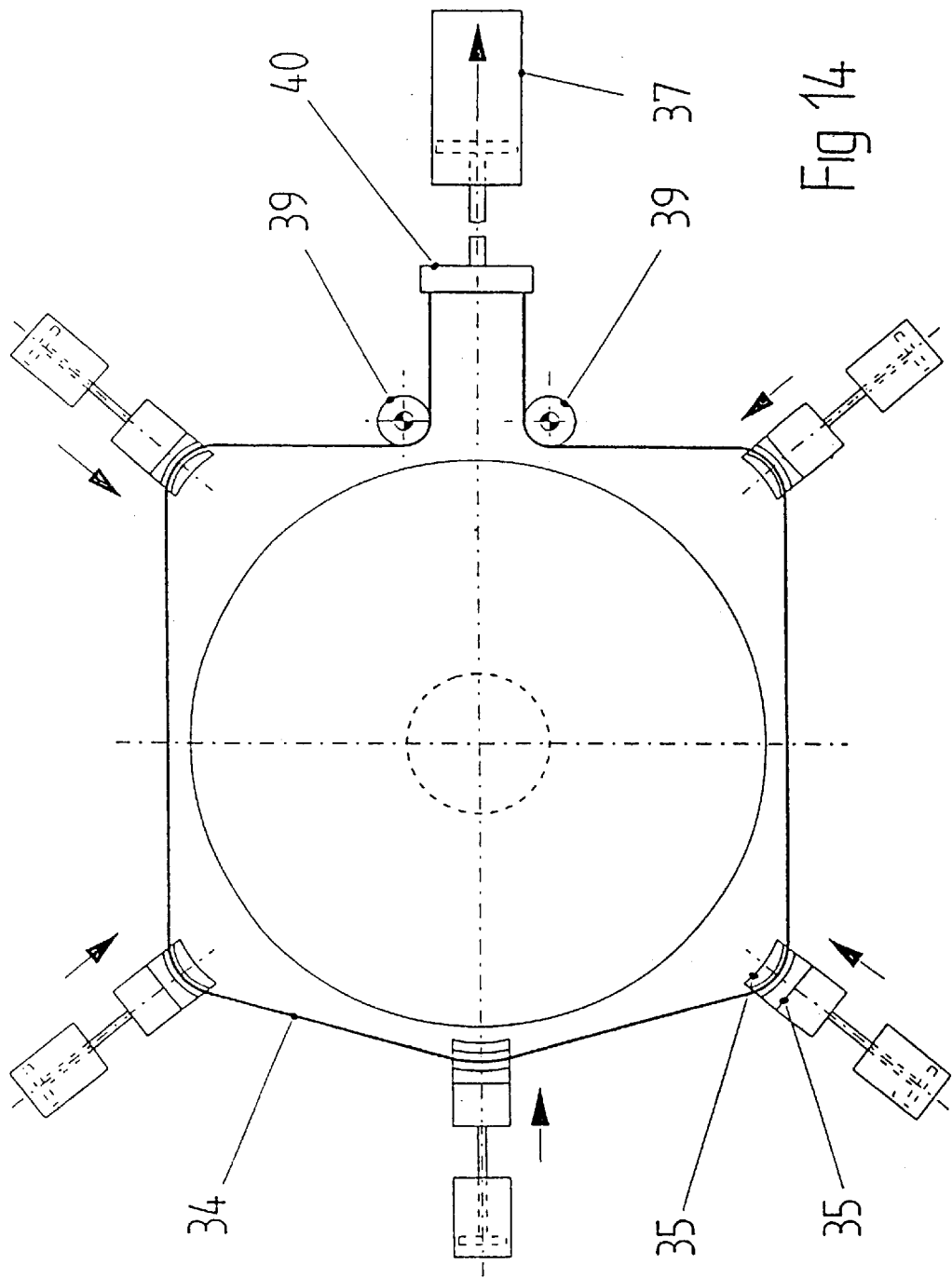

METHOD AND DEVICE FOR FOLDING AN AIRBAG FOR STOWING IN AN AIRBAG MODULE

DESCRIPTION

The invention relates to a method for folding an airbag for an airbag module according to the preamble of claim 1 and to a device for carrying out the method.

In order to be able to stow an airbag in an airbag module it is known to fold the airbag into a suitably small packet. Various ways of folding are known. From U.S. Pat. No. 4,173,356 for example different types of straight-line folding are known where the folds run in rays out from a centre or approximately parallel to each other. These types of folding have the drawback that they have to be gathered together at least when used for a vehicle airbag module so that when the airbag of this kind unfolds the internal pressure produced in some areas of the airbag prevents the opening of some folds. Furthermore the expense in folding is considerable.

From DE 44 22 276 A1 an airbag is known for an airbag module where the airbag has main folds which run at least in one part along closed paths round an imaginary centre on the substantially empty spread-out airbag. The closed main folds preferably describe circular paths or ellipses of slight eccentricity.

This path of the main folds has the advantage that the folded airbag can open very rapidly and quickly. More particularly during unfolding of such an airbag there is not the danger that the internal pressure produced in some area parts of the airbag will prevent the opening of further folds. This airbag can thereby be used for driver, passenger and side airbags. The drawback with this type of folding is that the expense for machine folding is high.

The object of the invention is therefore to reduce the expense of gathering an airbag into a size which allows storage in an airbag module whilst ensuring that easy complete unfolding of the airbag in the event of a crash is guaranteed.

This is achieved according to the invention through the characterising features of claim 1.

The method for folding the airbag is characterised according to the invention in that the spread-out empty airbag is gathered towards the centre inside a fixed vertical profiled section. As opposed to other types of folding known up until now with this method a chaotic folding is undertaken, i.e. the folds have no predetermined shape and direction. It was found however that this folding is substantially free of rear cut sections since the upper part of the airbag always remains at the top. Opening of all the folds is thereby guaranteed during the unfolding process of the airbag.

The gathering process can be carried out from all sides evenly within the predetermined height. With an asymmetric airbag module it is however expedient that the airbag is gathered in one direction and then in the direction at right angles to this alternately until the required size is reached. Gathering is thereby first undertaken at the sides where there is little space for storing the airbag in the airbag module.

The advantage of this process is that only a few gathering elements are required for gathering the airbag and that compared with known folding processes substantially fewer work steps are required. All airbag embodiments can be folded eg with arrester straps and rip seams.

The expense of folding the airbag is only increased by an insignificant amount if according to a further design of the invention a desired folding position and bending direction of the airbag fabric is imprinted in the spread-out empty airbag prior to gathering. This can be achieved if prior to gathering the spread-out empty airbag is pre-folded folded by mechanical forming elements and/or through heat, steam, pressure or vacuum action.

In a preferred embodiment of the method it is proposed to pleat the spread out empty airbag prior to gathering.

It is expedient if the inflating device or a simulator of the inflating device which keeps a space free for the inflating device which is to be installed later, is positioned and pre-fitted in the spread-out airbag before the latter is gathered.

A device for carrying out the method indicated above is characterised in that a lower part is provided for holding the spread out airbag and an upper part is provided at distances from the lower part so that the distances correspond to the vertical profiled section of the gathered airbag which is required, and that gathering elements are provided between the upper part and lower part which enclose the airbag and whose position can be changed relative to same. The upper and lower part are displaceable relative to each other. The spread out empty airbag for the gathering process is placed on the lower part and the upper part is then positioned at the required height above the lower part. The gathering elements are then pushed against the airbag until this has the required shape and size necessary for installation in the airbag module.

For gathering the airbag preferably four gathering elements are provided of which each two oppose each other in pairs wherein the pairs lie cross-wise relative to each other. With this arrangement it is reached that the airbag is enclosed by the gathering elements around its entire circumference.

The upper part is preferably formed multi-part by providing a segment which is designed as a holding-down element which has the shape and size of the gathered airbag and can be moved separately. By means of this holding down element it is possible to bring the gathered airbag in the gathering device also into the airbag module or into the generator plate.

Furthermore it is expedient to also make the lower part multi-part by providing a segment which is designed as a generator support plate holder which can be moved separately through a cut-out section in a lower plate and also by providing sliders which can slide on the lower plate and enclose at least in part screws of the gas generator as well as holding rods for the generator support plate holder. This divided lower part allows the gathered airbag to be fitted into the generator support plate together with the aforementioned divided upper part.

In a further embodiment at least one tension band can be provided as the gathering element.

To predetermine a creasing or bending direction of the airbag through bores are provided in the upper and/or lower part which can be attached to a compressed air or vacuum generator. In the area of the through bores the airbag can be pressed away from the upper or lower part prior to gathering through the incoming compressed air or can be sucked in by the upper or lower part as a result of a vacuum.

DESCRIPTION OF THE DRAWINGS

In a further embodiment movable pins are provided in the upper and/or lower part to move relative to the airbag to provide a bending or creasing direction for the airbag.

In another embodiment it is proposed to complete the gathering device by a pleating device by means of which the airbag can be pre-folded.

Figure 1:
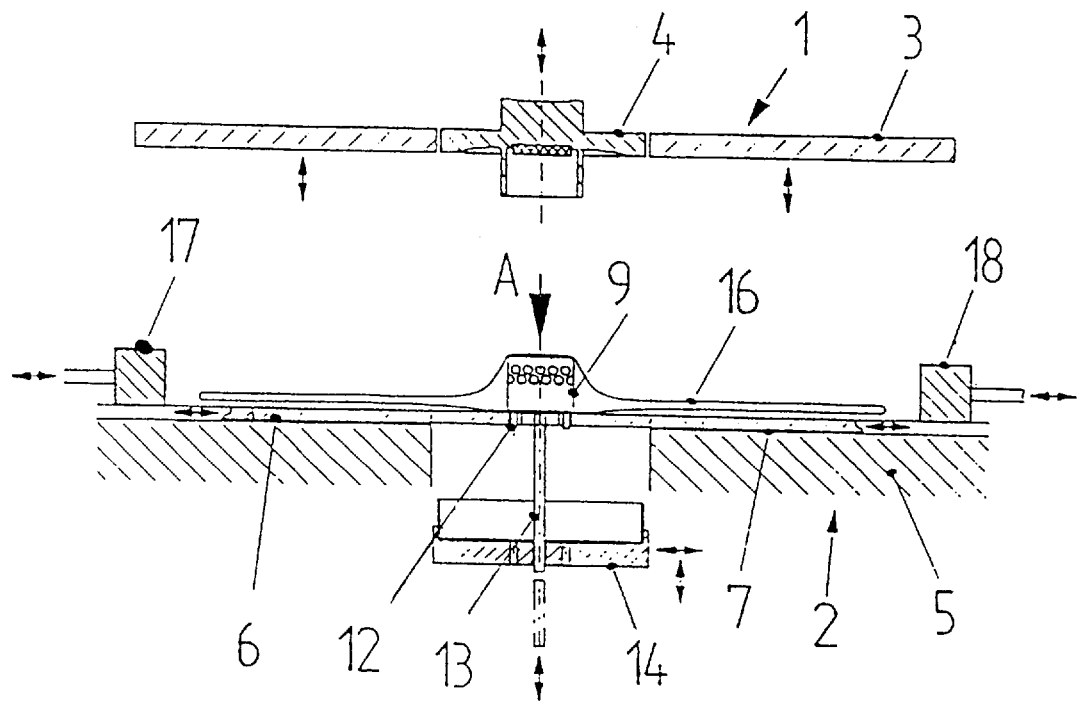

As a pleating device two ironing plates can be provided each with a matching surface structure which corresponds to the proposed folding path. Pleating wheels can also be provided.

This prefolding can be preserved or reinforced by cold and dampness.

Figure 2:
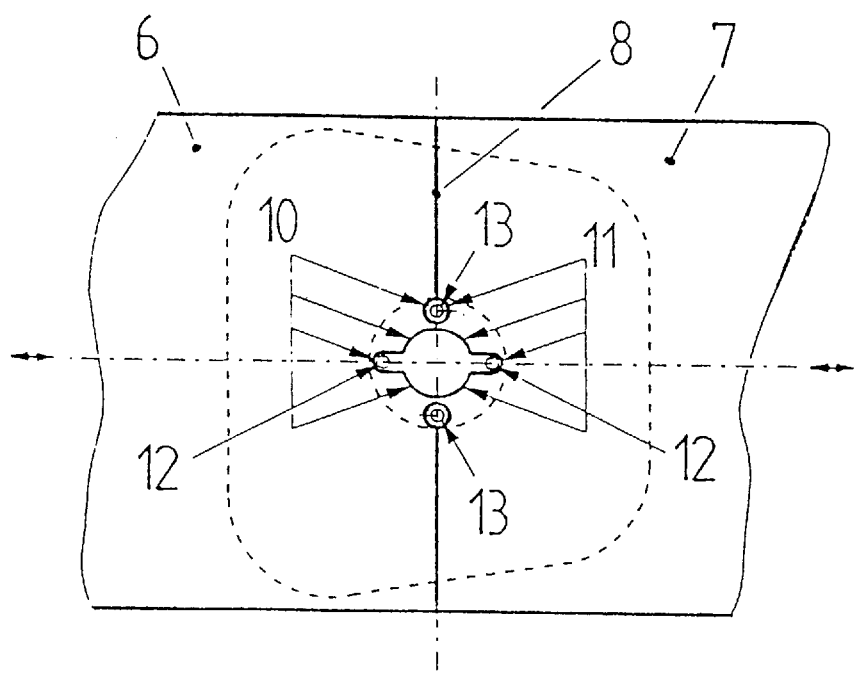
Figure 3:
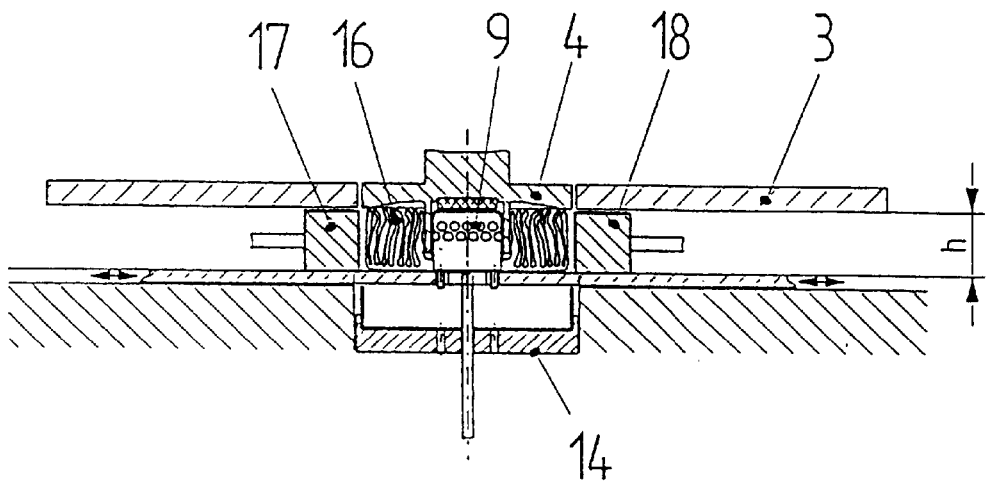
Figure 4:
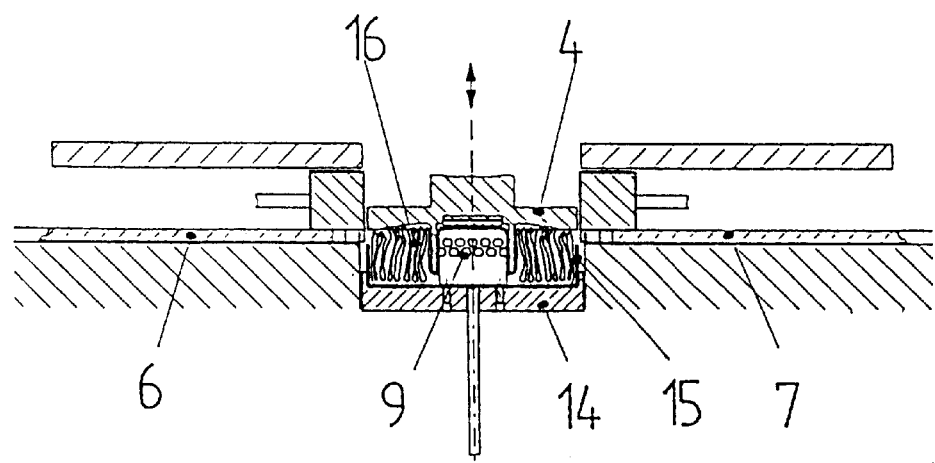
Figure 5:
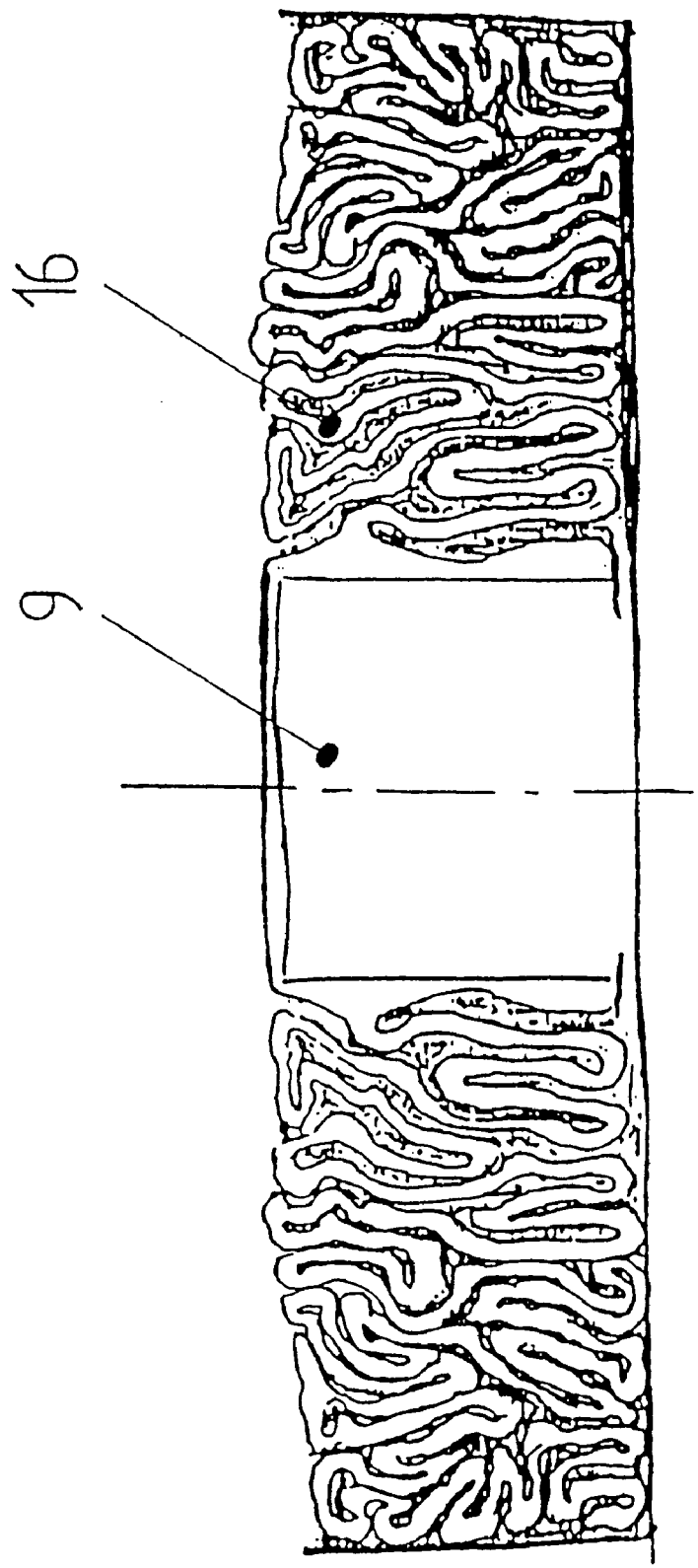
Figure 6:
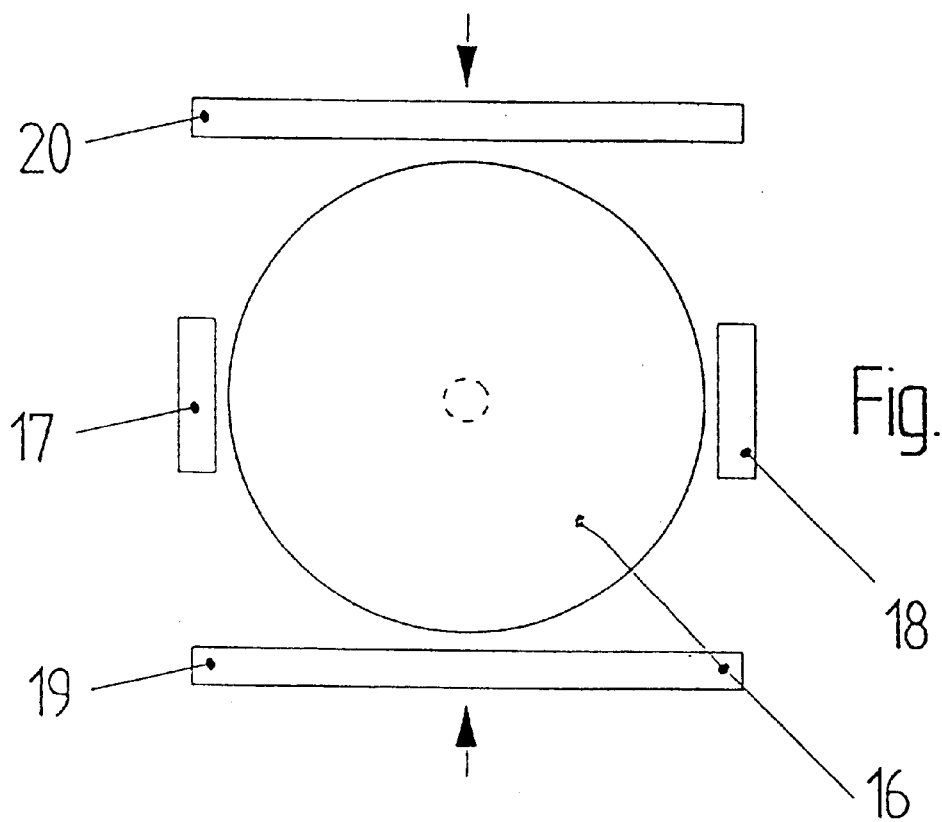
Figure 6:
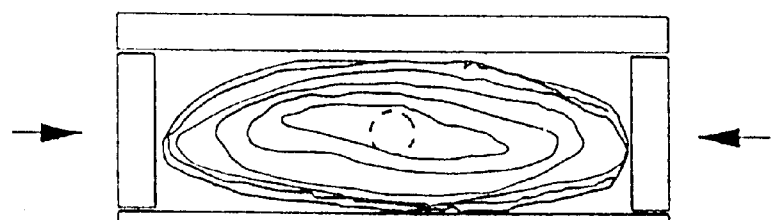
Figure 6:
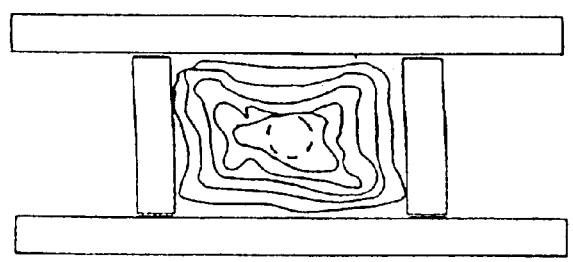
Figure 10:
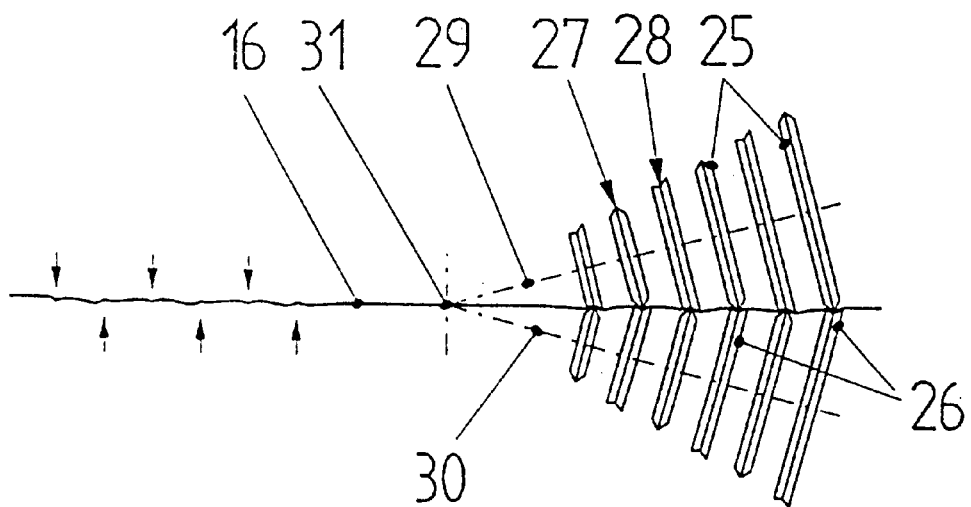
Figure 11:
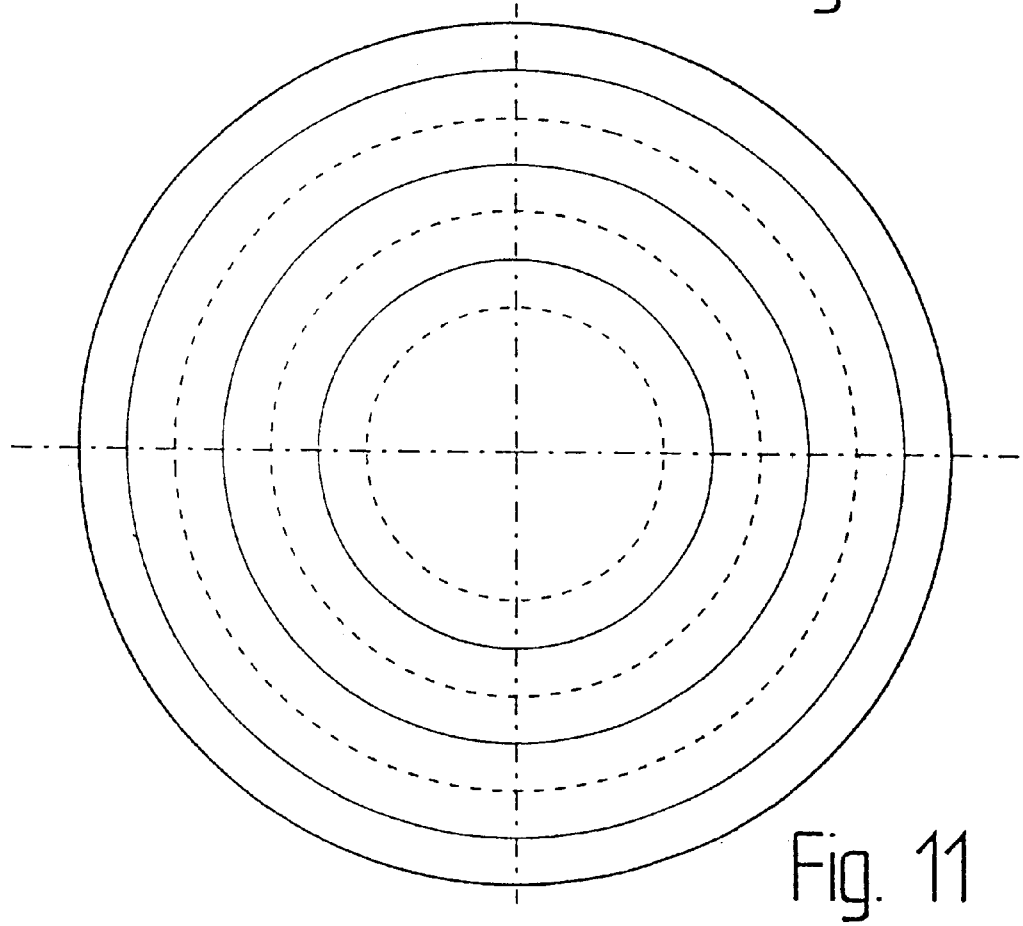
Figure 15:
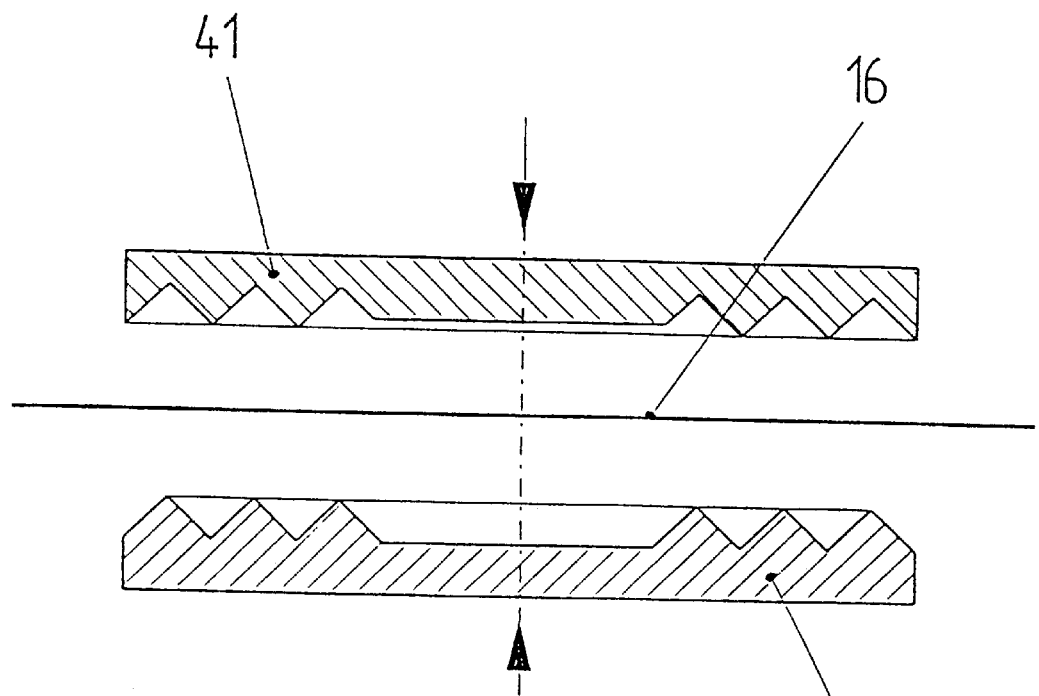
Figure 16:
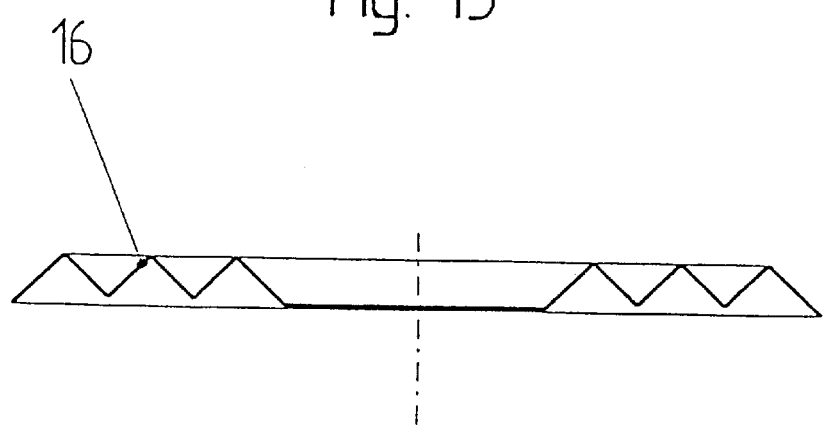

The invention will now be explained with reference to the embodiments shown in the drawings in which:

FIG. 1 shows a cross-section through a gathering device in the starting position:

FIG. 2 shows two sliders in plan view which are a component part of the lower part of the gathering device;

FIG. 3 shows the position of the gathering device according to FIG. 1 after the gathering process;

FIG. 4 shows the position of the gathering device according to FIG. 1 when introducing the gathered airbag into a generator support plate;

FIG. 5 is a cross-sectional view through a gathered airbag without prior shaping or provision of the bending or creasing direction;

FIGS. 6a–6c are plan views of the gathering elements before and after gathering as well as during gathering;

FIG. 7 shows the gathering device with additional openings in the upper and lower parts for introducing compressed air;

FIG. 8 shows the gathering device with additional openings for connecting to a vacuum generator;

FIG. 9 shows the gathering device with additional pins in the upper and lower parts;

FIG. 10 shows diagrammatically the construction of a pleating device;

FIG. 11 shows the path of the folds provided in the airbag;

FIG. 12 shows a partial sectional view through a folded airbag in a gathering device with tension band;

FIG. 13 shows a plan view of FIG. 12;

FIG. 14 shows a plan view on an unfolded airbag in a gathering device with tension band;

FIG. 15 shows a section through ironing plates with the airbag inbetween prior to prefolding;

FIG. 16 shows a section through the airbag after preshaping by means of the ironing plates according to FIG. 15.

The gathering device consists of an upper part 1 and a lower part 2. The upper part 1 has an upper plate 3 and a holding down member 4 in an opening of this plate. The lower part 2 consists of a lower plate 5 on which two sliders 6,7 are mounted movable relative to each other. As can be seen from FIG. 2 the sliders meet each other in the position of FIG. 1 with straight parallel edges 8 and thereby enclose with rounded edge sections 10, 11 a gas generator 9 as well as screws 12 of the gas generator 9 and retaining rods 13 for the gas generator. A generator support plate 15 is mounted underneath the sliders 6,7 in a holder 14. The holder 14 can be displaced upwards through a recess in the lower plate 5.

An airbag 16 is located in the spread out empty state on the sliders 6,7 between gathering elements 17&20 (FIG. 6) of which only two are shown in FIG. 1.

In order to carry out the gathering of the airbag 16 the upper part 1 is first lowered until the distance h (FIG. 3) between the upper part 1 and lower part 2 corresponds to the proposed height of the folded airbag. In this position the airbag 16 is fixed firm on the gas generator 9 by the holding down member 4. The gathering elements 17 to 20 enclose the spread-out airbag 16 (FIG. 6a) and fit with slight play between the upper and lower part.

For gathering, the gathering elements are moved in the direction of the centre of the airbag. The gathering elements can thereby be pushed simultaneously or in succession. In FIGS. 6b and 6c the case is shown where first the gathering elements 19,20 are moved towards the centre. The gathering shown in FIG. 6b is thereby produced where the airbag becomes smaller in the direction of the gathering whilst it expands in the direction running crosswise relative to same.

At the end of gathering by means of the gathering elements 19, 20, gathering is undertaken crosswise relative to same by means of the gathering elements 17,18. The airbag thereby forms naturally into folds during the gathering process and is restricted top and bottom by the upper and lower parts.

The gathering process is completed when the airbag is compressed to such a size that it can be inserted in the airbag module. The generator support plate 15 belongs here into which the gathered airbag is to be inserted. To this end the holder 14 with generator support plate 15 is pushed up to the underneath of the sliders 6,7. The sliders 6,7 are then removed from the area of the airbag 16 and the gathered airbag 16 is pushed by means of the holding down member 4 together with the gas generator 9 into the generator support plate (FIG. 4).

It can be seen from the path of the folds shown in FIG. 5 that the folds have no preferred direction. Tests have shown however that with this natural folding the upper part of the airbag always lies at the top so that folding takes place substantially without rear cut sections. Easy unfolding of the entire airbag is thereby ensured.

Without a great multiple expense it is also possible to predefine the creasing and bending direction of the airbag. To this end in the embodiment of FIG. 7 through bores 21 are provided in the upper part 1 and through bores 22 are provided in the lower part 2 so that compressed air can be blown in through same into the space formed by the upper and lower parts 1,2 and the gathering elements 17 to 20. The spread out airbag 16 is pressed onto the lower part 1 through the compressed air of the through bores 21 whilst the airbag is lifted up by the compressed air to the through bores 22 so that the bending and creasing direction is predetermined. The biasing with compressed air can remain throughout the gathering process since no mechanical parts engage in the space between the upper and lower part.

In the embodiment of FIG. 8 through bores 23 are provided in the upper part 1 and through bores 24 are provided in the lower part 2 which are attached to a vacuum pump (not shown). As a result of the vacuum the airbag is sucked against the lower part in the area of the through bores 24 whilst it is lifted in the area of the through bores 23. Thus as with the embodiment of FIG. 7 the creasing and bending direction is thereby predetermined.

In the embodiment of FIG. 9 the upper part 1 has pins 32 of which only one is shown. Furthermore the lower part 2 has pins 33. These pins are mounted movable in the upper pat and lower part so that the pins of one part lie between the pins of each other part. If the pins are moved towards each other the airbag is pre-folded through the pins as shown in FIG. 9. During the gathering process as the gathering elements draw nearer so the pins 32, 33 are drawn back stepwise from the space between the upper part 1 and lower part 2 so that the airbag is brought by the gathering device to the size required for installation in the airbag module.

In the embodiment of FIG. 10 a pleating device is shown in diagrammatic form. This has pleating wheels 25 with a positive profile 27 on the circumference and counter wheels 26 with a negative profile 28. The pleating wheels with the positive and negative profiles mesh with each other so that the airbag 16 to be pleated is located between same.

The position of the axes relative to each other depends on the desired alignment of the folds. In the embodiment of FIG. 10 the folds are to run along circular paths as shown in FIG. 11. Therefore on each side of the airbag to be pleated pleating wheels of different size are mounted on shafts whose longitudinal axes 29, 30 run through a point 31.

The embodiment of FIGS. 12, 13 and 14 shows the gathering process performed by means of a tension band 34. This is associated with tension band jaws 35 which hold the tension band in its starting position by means of cylinders 36. The tension band 34 is drawn from this by means of a pressure cylinder 37 wherein the tension band jaws 35 thereby change their position as well until they adjoin an adjustable stop base plate 38 as shown in FIGS. 12 and 13. The tension band jaws 35 determine the outer shape of the gathered airbag since the tension band is bent down on each jaw 35. The direction of movement of the tension band jaws is shown by arrows in FIG. 14.

As can be seen from FIG. 14 the band ends run over guide pulleys 39 and are fixed on a cross bar 40 which is seated on the piston rod of the pressure cylinder 37. The airbag is shown in FIGS. 12 and 13 in the folded state whilst in FIG. 14 it is shown spread out between the tension bands prior to the start of folding.

The structure shown in FIGS. 11 and 16 can also be achieved by means of two ironing plates 41, 42 with matching surface structure. The folded position and direction of the folds are set in the airbag by steam and heat by means of these plates.

What is claimed is:

1. Method for folding an empty airbag for an airbag module to produce a folded airbag having a center and a predetermined height, the method comprising:
   spreading out the empty airbag;
   providing a fixed vertical profiled section having a top surface and a bottom surface separated by a distance corresponding to the predetermined height of the folded airbag with the airbag with gathering elements moving located between the top surface and the bottom surface; and
   thereafter gathering up the spread out empty airbag towards the center inside the fixed vertical profiled section in a direction generally parallel to the top and bottom surfaces thereby forming a plurality of folds in the airbag.

2. Method according to claim 1, wherein the gathering step comprises gathering the airbag first in one direction and then in a direction perpendicular thereto down to a required size.

3. Method according to claim 1 further comprising the step of:
   imprinting on the spread out empty airbag, before the gathering step, a desired fold position and bending direction of an airbag fabric.

4. Method according to claim 1 further comprising the step of:
   pre-folding the spread out empty airbag, prior to the gathering step, through mechanical shaping elements or through heat, steam, pressure or vacuum action or through any combination thereof.

5. Method according to claim 1 further comprising the step of:
   pleating the spread out empty airbag prior to the gathering step.

6. Method according to claim 1 further comprising the step of:
   positioning an air inflating device in the spread out airbag before the gathering step.

7. Device for folding an airbag to provide a gathered airbag having a predetermined vertical profile, comprising:
   a lower part for holding a spread out airbag,
   an upper part distanced from the lower part to form a fixed vertical profile section corresponding to the predetermined vertical profile of the gathered airbag, and
   gathering elements between the upper part and lower part, wherein the gathering elements have an inner surface to contact the airbag and the position of the gathering elements can be moved in a direction generally parallel to the upper part and lower part, whereby, during operation, the inner surfaces of the gathering elements contact and enclose the airbag as the airbag is gathered.

8. Device according to claim 7 wherein the gathering elements comprise four gathering elements,
   wherein each two gathering elements are opposite each other in pairs, and
   wherein the pairs of gathering elements lie crosswise relative to each other.

9. Device according to claim 7 wherein the upper part is multi-part,
   wherein a separately movable segment is provided,
   wherein the separately movable segment is designed as a holding down holder, and
   wherein the separately movable segment has a size of the gathered airbag.

10. Device according to claim 7 wherein the lower part is multi-part and further comprises,
    a segment designed as a generator support plate holder wherein the segment can be moved separately through a cut out section in a lower plates, and
    wherein sliders are provided, and
    wherein the sliders are displaceable on the lower plate to encloses, at least in part screws of a gas generator as well as holding rods for the generator support plate holder.

11. Device according to claim 7 wherein the upper part or the lower part comprises through bores.

12. Device according to claim 7 wherein the gathering element comprise at least one tension band.

13. Device according to claim 7 wherein the upper part or lower part contains pins, and
    wherein the pins can be moved relative to the airbag to pre-shape a creasing and folding direction of the airbag.

14. Device according to claim 7 further comprising a pleating device.

15. Device according to claim 14 wherein the pleating device further comprises two ironing plates, and
    wherein the ironing plates comprise matching surface structures corresponding to a proposed folding path.

16. Device according to claim 14 wherein the pleating device further comprises pleating wheels.

17. Device according to claim 11 wherein the through bores are attached to a compressed air generator.

18. Device according to claim 11 wherein the through bores are attached to a vacuum generator.

19. Method according to claim 1 wherein the plurality of folds of the airbag have no predetermined shape or direction.

20. Method according to claim 1 wherein the spread out empty airbag is flat at the beginning of the gathering step.

21. Method according to claim 1 wherein the gathering step includes gathering the airbag inside the fixed vertical profiled section using a plurality gathering elements, each having an inner surface in contact with the airbag, and further wherein the inner surface of each gathering element does not overlap with the inner surface of any other gathering element.

22. Device according to claim 7 wherein the gathering elements each have an inner surface in contact with the airbag, and further wherein the inner surface of each gathering element does not overlap with the inner surface of any other gathering element.

23. Method according to claim 1 wherein the gathering step includes gathering the airbag inside the fixed vertical profiled section using a plurality gathering elements, each having a generally flat inner surface in contact with the airbag.

24. Device according to claim 7 wherein the gathering elements each have a generally flat inner surface in contact with the airbag.

25. Method according to claim 1, farther comprising including a gas generator at a center of the spread out airbag within the fixed vertical profile section, wherein the gathering step includes gathering the airbag inside the fixed vertical profiled section by moving a plurality gathering elements in alignment with the gas generator.

26. Method according to claim 1, wherein the method for folding is performed without inflating the airbag.

27. A method according to claim 1, wherein the top surface overlies the entire spread out airbag.

28. A method according to claim 27, comprising vertically moving at least a portion of the upper surface in concert with at least a portion of the bottom surface with the folded airbag therebetween.

29. An apparatus according to claim 7, wherein the upper part overlies the entire spread out airbag.

30. An apparatus according to claim 29, wherein at least a portion of the upper part is vertically moveable in concert with at least a portion of the lower part.

31. A method according to claim 1, wherein the vertical profiled section is provided by vertically lowering the top surface toward the bottom surface.

32. An apparatus according to claim 7, wherein the upper part is in a first position when it is distanced from the lower part to form the fixed vertical profiled section, and further wherein the upper part is vertically moveable between the first position and a second position above the first position.

33. Method for folding an empty airbag for an airbag module to produce a folded airbag having a center and a predetermined height, the method comprising:

spreading out the empty airbag; providing a fixed vertical profiled section having a top surface and a bottom surface separated by a distance substantially corresponding to the predetermined height of the folded airbag; and gathering up the spread out empty airbag towards the center with gathering elements inside the fixed vertical profiled section in a direction generally parallel to the top surface and the bottom surface wherein the gathering elements each have a height corresponding to the predetermined height substantially of the folded airbag, thereby forming a plurality of folds in the airbag.

34. Device for folding an airbag to provide a gathered airbag having a predetermined vertical profile, comprising:

a lower part for holding a spread out airbag, an upper part distanced from the lower part to form a fixed vertical profile section corresponding to the predetermined vertical profile of the gathered airbag, and gathering elements between the upper part and lower part, wherein the gathering elements enclose the airbag and can be moved in a direction generally parallel to the upper part and lower part, and further wherein the gathering elements each have a height substantially corresponding to the predetermined height of the folded airbag.

35. Method for folding an empty airbag for an airbag module to produce a folded airbag having a center and a predetermined height, the method comprising:

spreading out the empty airbag; providing a fixed vertical profiled section having a top surface and a bottom surface separated by a distance substantially corresponding to the predetermined height of the folded airbag; and gathering up the spread out empty airbag with gathering elements moving towards the center inside the fixed vertical profiled section in a direction generally parallel to the top and bottom surfaces, wherein the gathering elements have inner surfaces that contact and enclose the airbag as the airbag is gathered, thereby forming a plurality of folds in the airbag.

36. An airbag folding apparatus for producing a folded airbag having a top, the apparatus including:

a loading portion to permit a flatly spread airbag having a center to be place thereon;

a pushing means for pushing the peripheral edge of the airbag toward the center; and a height restricting means for restricting the distance between the top of folded airbag and the loading portion.

* * * * *